(12) United States Patent
Solomon et al.

(10) Patent No.: US 11,407,196 B2
(45) Date of Patent: Aug. 9, 2022

(54) ARTICLE WITH MICROSTRUCTURED LAYER

(71) Applicant: 3M INNOVATIVE PROPERTIES COMPANY, St. Paul, MN (US)

(72) Inventors: Jeffrey L. Solomon, Vadnais Heights, MN (US); Michael Benton Free, Stillwater, MN (US); Steven J. McMan, Stillwater, MN (US); Martin B. Wolk, Woodbury, MN (US); Elisa M. Cross, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/066,943

(22) PCT Filed: Dec. 22, 2016

(86) PCT No.: PCT/US2016/068321
§ 371 (c)(1),
(2) Date: Jun. 28, 2018

(87) PCT Pub. No.: WO2017/116991
PCT Pub. Date: Jul. 6, 2017

(65) Prior Publication Data
US 2019/0016086 A1   Jan. 17, 2019

Related U.S. Application Data

(60) Provisional application No. 62/271,611, filed on Dec. 28, 2015.

(51) Int. Cl.
*B32B 3/30* (2006.01)
*B32B 7/12* (2006.01)
(Continued)

(52) U.S. Cl.
CPC ............... *B32B 3/30* (2013.01); *B32B 7/05* (2019.01); *B32B 7/12* (2013.01); *B32B 7/14* (2013.01);
(Continued)

(58) Field of Classification Search
CPC .......... B32B 3/30; B32B 37/144; B32B 7/05; B32B 27/40; B32B 27/38; B32B 27/365;
(Continued)

(56) References Cited

U.S. PATENT DOCUMENTS 3,515,778 A   6/1970   Fields
4,097,634 A   6/1978   Bergh
(Continued)

FOREIGN PATENT DOCUMENTS

JP        2015-200898     11/2015
WO    WO 2005-003822     1/2005
(Continued)

OTHER PUBLICATIONS

Bass, "Transfer molding of nanoscale oxides using water-soluble templates", American chemical society, 2011, vol. 5, No. 5, pp. 4065-4072.
(Continued)

*Primary Examiner* — Nathan L Van Sell
(74) *Attorney, Agent, or Firm* — Jonathan L. Tolstedt

(57) ABSTRACT

Article comprising a first, microstructured layer comprising a first material, and having first and second opposed major surfaces, the first major surface being a microstructured surface, and the microstructured surface having peaks and valleys, wherein the peaks are microstructural features each having a height defined by the distance between the peak of the respective microstructural feature and an adjacent valley; and a second layer comprising at least one of a crosslinkable or crosslinked composition, wherein at least a portion of the
(Continued)

second major surface of the second layer is directly attached to at least a portion of the first major surface of the first, microstructured layer. Articles described herein are useful, for example, for optical film applications. For example. An article including a regular prismatic microstructured pattern can act as a totally internal reflecting film for use as a brightness enchancement film; an article including a corner-cube prismatic microstructured pattern can act as a retroreflecting film or element for use as reflecting film when combined with a back reflector; and an article including a prismatic microstructured pattern can act as an optical turning film or element for use in an optical display.

9 Claims, 5 Drawing Sheets

(51) Int. Cl.
| | | |
|---|---|---|
| B32B 27/08 | (2006.01) | |
| B32B 27/36 | (2006.01) | |
| G02B 5/02 | (2006.01) | |
| B32B 27/18 | (2006.01) | |
| B32B 27/32 | (2006.01) | |
| B32B 27/28 | (2006.01) | |
| B32B 27/30 | (2006.01) | |
| B32B 7/05 | (2019.01) | |
| B32B 7/14 | (2006.01) | |
| B32B 27/38 | (2006.01) | |
| B32B 27/40 | (2006.01) | |
| B32B 37/14 | (2006.01) | |
| G02F 1/1335 | (2006.01) | |
| F21V 8/00 | (2006.01) | |

(52) U.S. Cl.
CPC .............. *B32B 27/08* (2013.01); *B32B 27/18* (2013.01); *B32B 27/285* (2013.01); *B32B 27/308* (2013.01); *B32B 27/32* (2013.01); *B32B 27/325* (2013.01); *B32B 27/36* (2013.01); *B32B 27/365* (2013.01); *B32B 27/38* (2013.01); *B32B 27/40* (2013.01); *B32B 37/144* (2013.01); *G02B 5/0231* (2013.01); *G02B 5/0278* (2013.01); *G02B 6/0053* (2013.01); B32B 2250/24 (2013.01); B32B 2305/72 (2013.01); B32B 2307/40 (2013.01); B32B 2307/416 (2013.01); B32B 2307/418 (2013.01); B32B 2307/42 (2013.01); B32B 2307/518 (2013.01); B32B 2307/732 (2013.01); B32B 2457/20 (2013.01); B32B 2457/202 (2013.01); B32B 2551/00 (2013.01); *G02B 6/0065* (2013.01); *G02F 1/133607* (2021.01)

(58) Field of Classification Search
CPC ....... B32B 27/36; B32B 27/325; B32B 27/32; B32B 27/308; B32B 27/285; B32B 27/18; B32B 27/08; B32B 7/14; B32B 7/12; B32B 2305/72; B32B 2307/518; B32B 2307/418; B32B 2457/202; B32B 2457/20; B32B 2307/732; B32B 2307/42; B32B 2307/416; B32B 2307/40; B32B 2250/24; B32B 2551/00; G02B 6/0053; G02B 5/0278; G02B 5/0231; G02B 6/0065; G02F 2001/133607
See application file for complete search history.

(56) References Cited

U.S. PATENT DOCUMENTS

| | | |
|---|---|---|
| 4,576,850 A | 3/1986 | Martens |
| 5,175,030 A | 12/1992 | Lu |
| 5,182,069 A | 1/1993 | Wick |
| 5,183,597 A | 2/1993 | Lu |
| 5,635,278 A | 6/1997 | Williams |
| 5,786,006 A | 7/1998 | Lindon |
| 6,784,962 B2 | 8/2004 | Sumida |
| 6,846,089 B2 | 1/2005 | Stevenson |
| 7,074,463 B2 | 7/2006 | Jones |
| 7,244,476 B2 | 7/2007 | Sumida |
| 7,678,443 B2 | 3/2010 | Schulz |
| 7,713,604 B2 | 5/2010 | Yang |
| 7,833,820 B2 | 11/2010 | Rantala |
| 8,123,384 B2 | 2/2012 | Negley |
| 8,282,863 B2 | 10/2012 | Jones |
| 8,623,140 B2 | 1/2014 | Yapel |
| 8,730,579 B2 | 5/2014 | Lee |
| 8,986,812 B2 | 3/2015 | Hunt |
| 9,102,083 B2 | 8/2015 | David |
| 2002/0081787 A1 | 6/2002 | Kohl |
| 2004/0102031 A1 | 5/2004 | Kloster |
| 2004/0137728 A1 | 7/2004 | Gallagher |
| 2004/0190102 A1 | 9/2004 | Mullen |
| 2005/0069678 A1 | 3/2005 | Olczak |
| 2006/0132945 A1* | 6/2006 | Sano ............... B29C 43/021 359/883 |
| 2007/0253072 A1 | 11/2007 | Mullen |
| 2008/0049451 A1 | 2/2008 | Wang |
| 2009/0020220 A1 | 1/2009 | Aikawa |
| 2009/0041553 A1 | 2/2009 | Burke |
| 2009/0160738 A1* | 6/2009 | Pellerite ............... B32B 7/02 345/32 |
| 2009/0297773 A1* | 12/2009 | Wang ............... G02B 5/0226 428/147 |
| 2010/0028660 A1* | 2/2010 | Yeh .................... C08F 2/48 428/334 |
| 2010/0246021 A1 | 9/2010 | Sung |
| 2011/0126293 A1 | 5/2011 | Berengoltz |
| 2011/0157867 A1 | 6/2011 | Lin |
| 2011/0299012 A1 | 12/2011 | Wang |
| 2013/0004728 A1 | 1/2013 | Boyd |
| 2014/0016208 A1 | 1/2014 | Edmonds |
| 2014/0185273 A1 | 2/2014 | Metral |
| 2014/0242343 A1 | 7/2014 | Tsai |
| 2014/0046837 A1 | 8/2014 | Free |
| 2015/0050750 A1 | 2/2015 | Sone |

FOREIGN PATENT DOCUMENTS

| | | |
|---|---|---|
| WO | WO 2011-126293 | 10/2011 |
| WO | WO 2011-130151 | 10/2011 |
| WO | WO 2012-138495 | 10/2012 |
| WO | WO 2012-166460 | 12/2012 |
| WO | WO 2014-014595 | 1/2014 |
| WO | WO 2014-046837 | 3/2014 |
| WO | WO 2015-050750 | 4/2015 |
| WO | WO 2015-050862 | 4/2015 |
| WO | WO 2015-108953 | 7/2015 |
| WO | WO 2017-116984 | 7/2017 |
| WO | WO 2017-116987 | 7/2017 |
| WO | WO 2017-116996 | 7/2017 |

OTHER PUBLICATIONS

Nagato, "Iterative roller imprint of multilayered nanostructures", Elsevier Microelectronic engineering, 2010, vol. 87, pp. 1543-1545.
White, "Advanced Methods, Materials, and Devices for Microfluidics", Dissertation, Georgia Institute of Technology, Nov. 2003, pp. 001-241.
White, "Microsystems Manufacturing via Embossing of Photodefinable Thermally Sacrificial Materials", Proceedings of the SPIE, 2004, vol. 5374, pp. 361-370.

(56) References Cited

OTHER PUBLICATIONS

Hua, "Photodefinable Thermally Sacrificial Polycarbonate Materials & Methods for MEMS & Microfluidic Device Fabrication", ECS Trans, 2006, vol. 3, No. 10, pp. 389-397.
Frechet,"Thermally Depolymerizable Polycarbonates V. Acid catalyzed thermolysis of allylic and benzylic polycarbonates : A new route to resist imaging" Polymer Journal,1987, vol. 19, No. 1, pp. 31-49.
Jeon, "Vacuum Nano-Hole Array Embedded Organic Light Emitting Diodes.", Nanoscale, 2014, vol. 6, pp. 2642-2648.
Corbin, "Engineered porosity via tape casting, lamination and the percolation of pyrolyzable particulates", J.Am.Ceram.Soc, 1999, vol. 82, No. 7, pp. 1693-1701.
International Search report for PCT International Application No. PCT/US2016/068321 dated Apr. 14, 2017, 3 pages.

\* cited by examiner

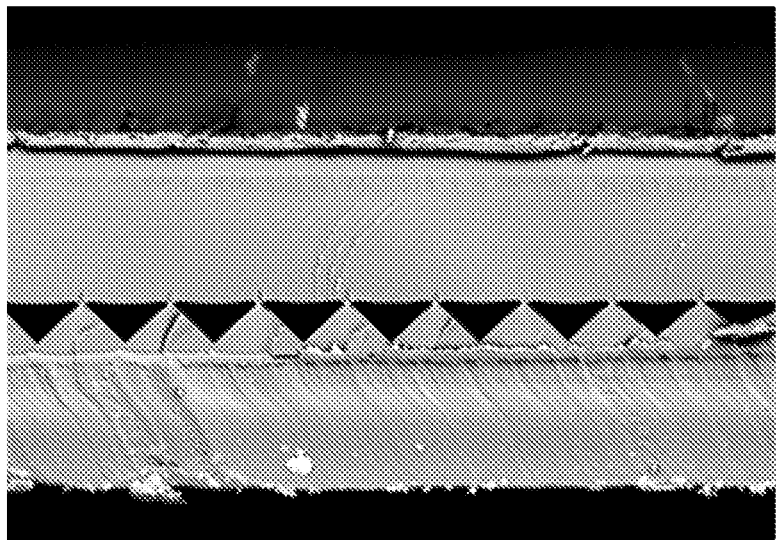
Fig. 5A  30μm
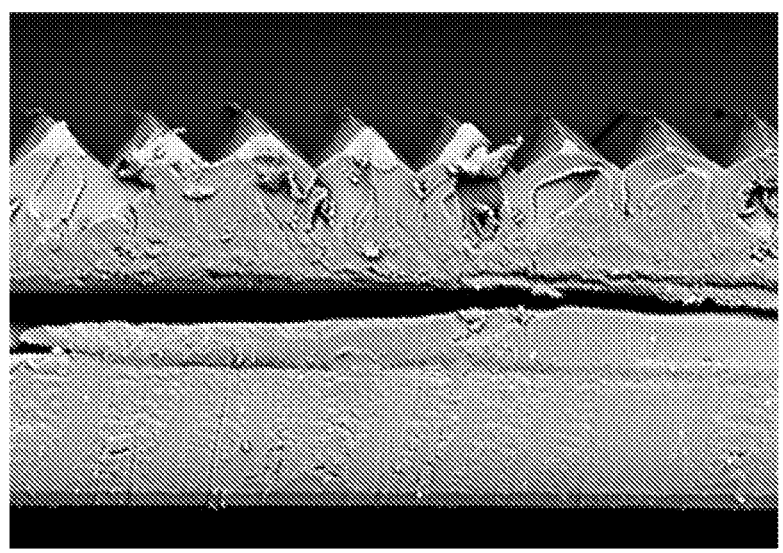
Fig. 5B  30μm

ARTICLE WITH MICROSTRUCTURED LAYER

CROSS REFERENCE TO RELATED APPLICATIONS

This application is a national stage filing under 35 U.S.C. 371 of PCT/US2016/068321, filed Dec. 22, 2016, which claims the benefit of Provisional Application No. 62/271, 611, filed Dec. 28, 2015, the disclosure of which is incorporated by reference in their entirety herein.

BACKGROUND

Microstructured films can be useful in optical displays. For example, a prismatic microstructured film can act a brightness enhancement film. Two or more microstructured films can be used together in many kinds of optical displays. In addition, one or more other optical films may be used in optical displays in conjunction with one or more microstructured films. These microstructured films and other optical films are typically manufactured separately and incorporated into the optical display at the time of its manufacture, or are incorporated into a sub-assembly or component, that is intended for incorporation into an optical display, at the time of its manufacture. This can be an expensive, time, and/or labor intensive manufacturing step. Some such microstructured films and other optical films are designed to include layers whose purpose is to provide stiffness or other advantages in handling during film manufacture, film converting, film transport, and optical display or sub-assembly component manufacture. This can add thickness and weight to such films beyond what would be necessary to fulfill their optical functions. Sometimes such microstructured films and other optical films are adhered to one another using an adhesive layer or layers when the optical display or sub-assembly component is manufactured. This too can add thickness and weight to the optical display or sub-assembly component, and it can sometimes also adversely affect the optics. Sometimes such microstructured films and other optical films must be very precisely arranged in an optical display in order for their principal optical axes to lie at precise angles to one another. This can be an expensive, time, and/or labor intensive manufacturing step, and even slight misalignment can adversely affect optical performance. There is a need for additional microstructured film constructions, including those that address or improve one of the drawbacks discussed above.

SUMMARY

In one aspect, the present disclosure describes an article comprising:

a first, microstructured layer comprising a first material, and having first and second opposed major surfaces, the first major surface being a microstructured surface, and the microstructured surface having peaks and valleys, wherein the peaks are microstructural features each having a height defined by the distance between the peak of the respective microstructural feature and an adjacent valley; and a second layer comprising at least one of a crosslinkable or crosslinked composition, and having first and second opposed major surfaces, wherein at least a portion of the second major surface of the second microstructured layer is directly attached to at least a portion of the first major surface of the first, microstructured layer. In some embodiments, the first major surface of the second layer is a microstructured surface, and the microstructured surface has peaks and valleys, wherein the peaks are microstructural features each having a height defined by the distance between the peak of the respective microstructural feature and an adjacent valley.

In another aspect, the present disclosure describes a method for making articles described herein, the method comprising:

providing a first layer comprising a partially crosslinked crosslinkable composition, and having first and second opposed major surfaces.

providing a second microstructured layer having first and second opposed major surfaces, the first major surface being a microstructured surface having microstructual features; and laminating the first major surface of the second microstructured layer such that the first major surface of the second layer is attached to the second major surface of the first layer. In some embodiments, the first layer is a microstructured layer, wherein, the first major surface of the first layer is a microstructured surface having microstructual features.

Articles described herein are useful, for example, in optical film applications. For example, an article including a regular prismatic microstructured pattern can act as a totally internal reflecting film for use as a brightness enhancement film when combined with a back reflector; an article including a corner-cube prismatic microstructured pattern can act as a retroreflecting film or element for use as reflecting film; and an article including a prismatic microstructured pattern can act as an optical turning film or element for use in an optical display.

BRIEF DESCRIPTION OF THE DRAWINGS

FIG. 5A is an SEM photomicrograph of the Example 4 article at 1300X cut perpendicular to the prisms of the first microstructured layer.

FIG. 5B is an SEM photomicrograph of the Example 4 article at 1500X cut perpendicular to the prisms of the second microstructured layer.

DETAILED DESCRIPTION

Exemplary articles described herein comprises, in order, an optional diffuser layer, an optional adhesive, an optional polymeric layer, an optional diffuser layer, a microstructured layer, layer (in some embodiments, the layer is optionally a microstructured layer), an optional adhesive layer, an optional polymeric layer, and an optional adhesive layer.

Figure 1:
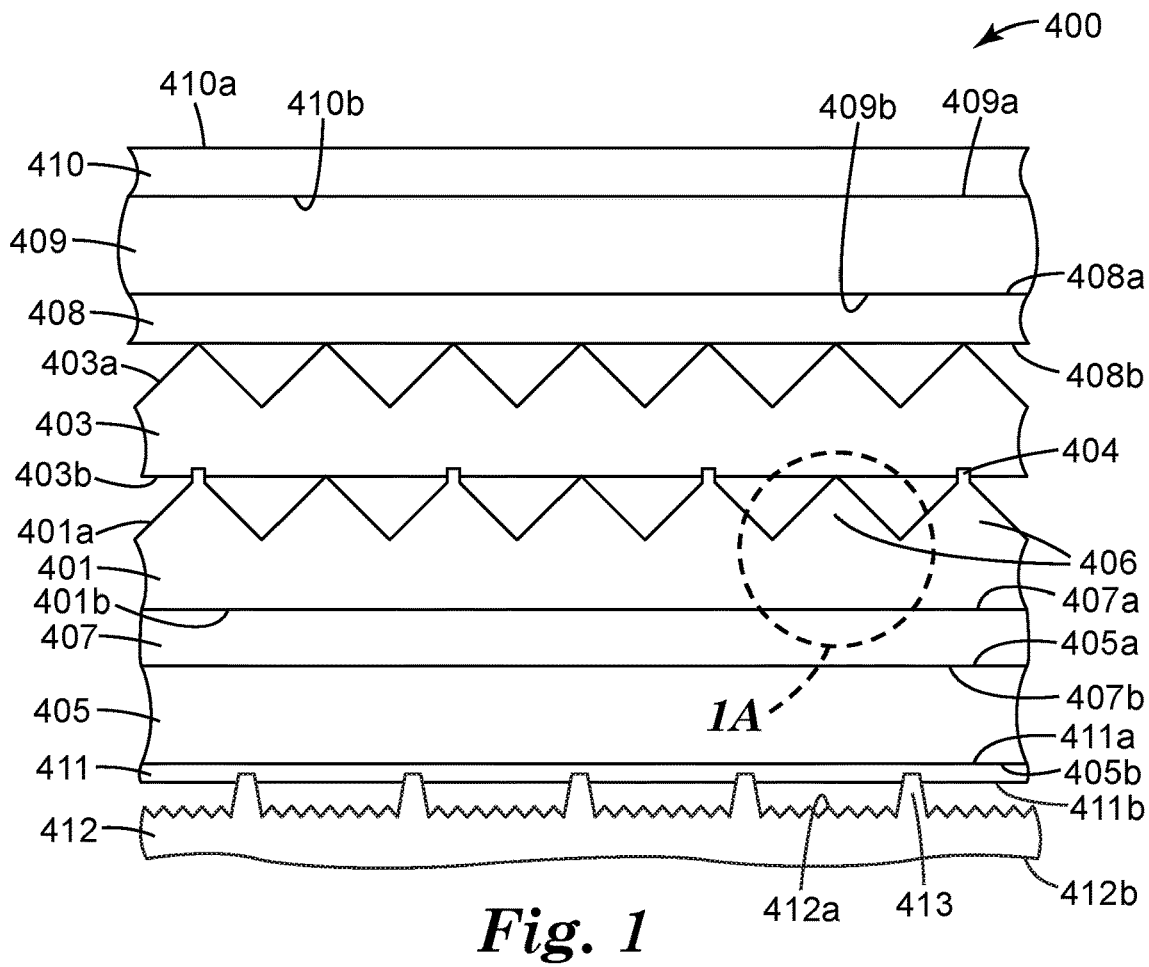
FIGS. 1 and 1A are cross-sectional views of an exemplary article described herein.
Figure 1A:
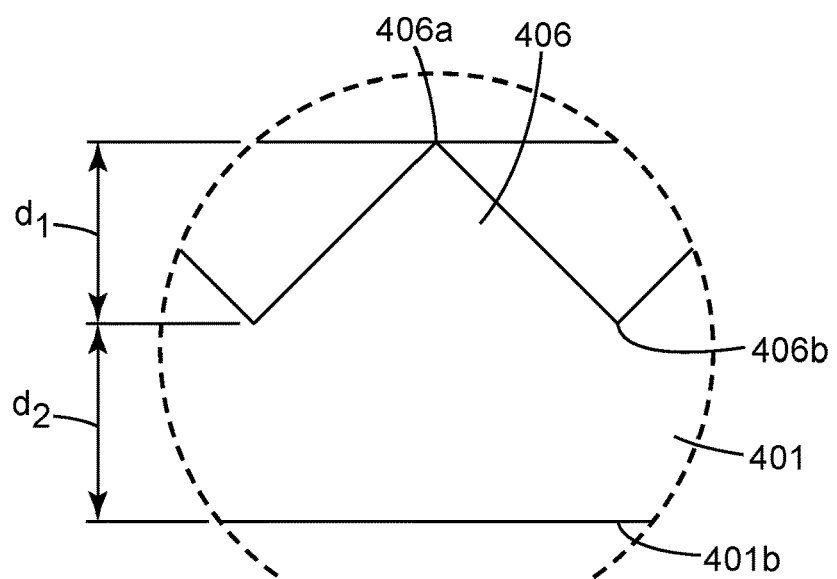

Referring to FIGS. 1 and 1A, exemplary article 400 comprises optional diffuser layer 412, optional adhesive layer 411, optional polymeric layer 405, optional diffuser layer 407, microstructured layer 401, layer (as shown a microstructured layer) 403, optional adhesive layer 408, optional polymeric layer 409, and optional adhesive layer 410. Microstructured layer 401 has first and second opposed major surfaces 401a, 401b, wherein major surface 401a is a microstructured surface. Microstructured layer 403 has first and second opposed major surfaces 403a, 403b. Major surface 403a is a microstructured surface. At least a portion of major surface 401a is directly attached to major surface 403b. As shown portion 404 of microstructured surface 401a penetrates into microstructured layer 403. Microstructured surface 401a has microstructual features 406 with peaks 406a and valleys 406b, wherein each microstructure feature has height, $d_1$, as measured from a peak (406a) to the lowest adjacent valley (406b). It is understood that the height measurement is the height perpendicular to surface 401b. Microstructured layer 401 has thickness, $d_2$, as measured from the lowest adjacent valley (406b) to major surface 401b.

Optional diffuser layer 412 has first and second major surfaces 412a, 412b. Optional adhesive layer 411 has first and second major surfaces 411a and 411b. As shown portion 413 of optional diffuser surface 412a penetrates into optional adhesive layer 411. Optional diffuser layer 407 has first and second opposed major surfaces 407a, 407b. As shown, major surface 407a is directly attached at least in part to major surface 401b. Optional polymeric layer 405 has first and second opposed major surfaces 405a, 405b. As shown, major surface 411a is directly attached at least in part to major surface 405b. As shown, major surface 405a is directly attached at least in part to major surface 407b. Optional adhesive layer 408 has first and second opposed major surfaces 408a, 408b. As shown, major surface 408b is directly attached at least in part to major surface 403a. Optional polymeric layer 409 has first and second opposed major surfaces 409a, 409b. As shown, major surface 409b is directly attached at least in part to major surface 408a. Optional adhesive layer 410 has first and second opposed major surfaces 410a, 410b. As shown, major surface 410b is directly attached at least in part to major surface 409a. If any optional layer is not present the respective adjacent major surfaces of layers present may be directly attached.

In general, microstructured layers are known in the art and can be provided using techniques known in the art (see, e.g., U.S. Pat. No. 5,182,069 (Wick), U.S. Pat. No. 5,175,030, (Lu et al.), U.S. Pat. No. 5,183,597 (Lu) and U.S. Pat. No. 7,074,463 B2 (Jones et al.), the disclosures of which are incorporated herein by reference).

Conventional microstructured layers made from crosslinkable materials are typically a composite construction of a crosslinked microstructured layer attached to a polymer film (e.g., polyester film) composed of a different material. Monolithic microstructured layers made of crosslinkable materials, however, are also known in the art (see, e.g., U.S. Pat. No. 4,576,850 (Martens). The second layer of articles described herein, which in some embodiments is a microstructured layer, has at least a portion directly attached to the first microstructured layer. That is, there is no intervening layer, including no polymer layer, between the microstructured surfaces of the first microstructured layer and the second layer. This construction allows even a relatively thin crosslinked (in some embodiments, microstructured) layer that is not robust enough to be handled independently (due, for example, to its thinness or composition) in typical industrial process (e.g., continuous or semi-continuous web processing) to be combined with other layers to form the articles described herein. By removing the polymer layer between the first and second layers, the articles described herein can provide for a reduction in thickness while providing comparable optical performance.

Microstructured layers for articles described herein can be formed, for example, by coating a crosslinkable composition onto a tooling surface, crosslinking the crosslinkable composition and removing the microstructured layer from the tooling surface. Microstructured layers for articles described herein can also be formed, for example, by coating a crosslinkable composition onto a tooling surface, applying a polymeric layer, crosslinking the crosslinkable composition and removing the tooling surface and optionally the polymeric layer. Microstructured layers comprising two microstructured surfaces can, for example, be formed by coating a crosslinkable composition onto a tooling surface, applying a polymeric layer wherein the major surface of the polymer layer in contact with the crosslinkable composition is a microstructured surface, crosslinking the crosslinkable composition and removing the tooling surface and the polymeric layer. Microstructured layers for articles described herein can also be formed, for example, by extruding a molten thermoplastic material onto a tooling surface, cooling the thermoplastic material and removing the tooling surface. The microstructures can have a variety of patterns, including regular prismatic, irregular prismatic patterns (e.g., an annular prismatic pattern, a cube-corner pattern or any other lenticular microstructure), non-periodic protuberances, pseudo-non-periodic protuberances, or non-periodic depressions, or pseudo-non-periodic depressions. The same techniques can be used to provide the second layer, even if it is not a microstructured layer, in which case the tool surface, for example, is simply planar.

Figure 2A:
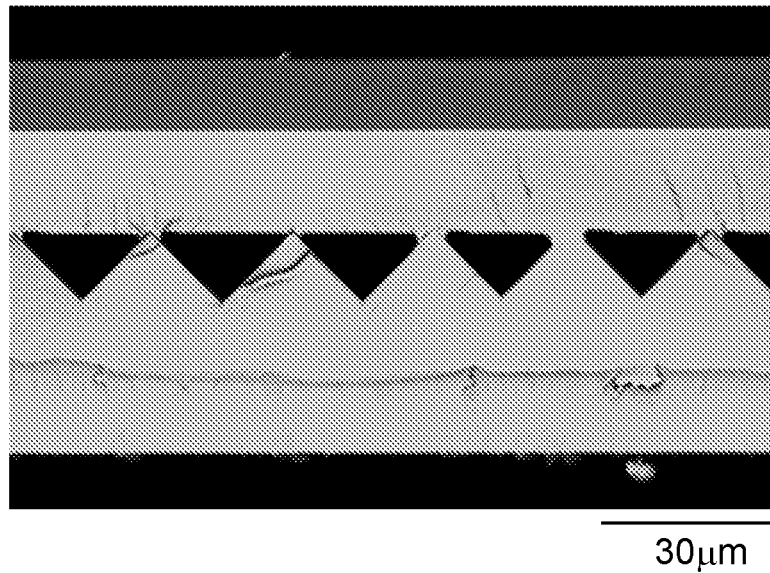
FIG. 2A is a scanning electron microscopy (SEM) photomicrograph of the Example 1 article at 1900X cut perpendicular to the prisms of the first microstructured layer.
Figure 2B:
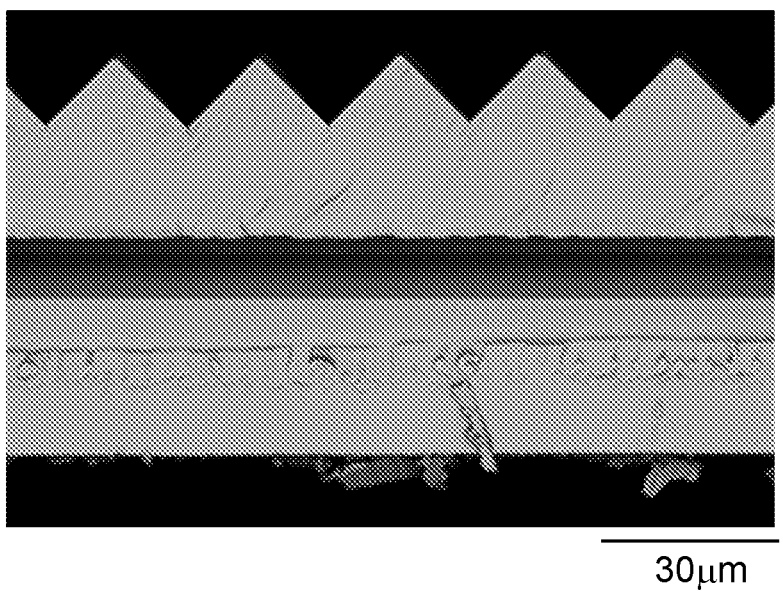
FIG. 2B is an SEM photomicrograph of the Example 1 article at 1900X cut perpendicular to the prisms of the second microstructured layer.

If the microstructural features of a microstructured layer have a directionality (e.g., linear structures such as prisms), the directionality of the microstructual features may be oriented at any angle. The prisms of a microstructured layer could, for example, be parallel or perpendicular or at any other angle relative to the microstructual features of another layer. For example, the prisms of the first microstructured layer and the prisms of the second microstructured layer of the Example 1 article are oriented perpendicular to each other (FIGS. 2A and 2B).

Microstructured layers can comprise, for example, a crosslinkable or crosslinked composition or thermoplastic material. Exemplary crosslinkable or crosslinked compositions include resin compositions may be curable or cured by a free radical polymerization mechanism. Free radical polymerization can occur by exposure to radiation (e.g., electron beam, ultraviolet light, and/or visible light) and/or heat. Exemplary suitable crosslinkable or crosslinked composition also include those polymerizable, or polymerized, thermally with the addition of a thermal initiator such as benzoyl peroxide. Radiation-initiated cationically polymerizable resins also may be used. Suitable resins may be blends of photoinitiator and at least one compound bearing an (meth)acrylate group.

Exemplary resins capable of being polymerized by a free radical mechanism include acrylic-based resins derived from epoxies, polyesters, polyether's, and urethanes, ethylenically unsaturated compounds, aminoplast derivatives having at least one pendant (meth)acrylate group, isocyanate derivatives having at least one pendant (meth)acrylate group, epoxy resins other than (meth)acrylated epoxies, and mixtures and combinations thereof The term (meth)acrylate is used here to encompass both the acrylate and methacrylate compound where ever both the acrylate and methacrylate compound exist. Further details on such resins are reported in U.S. Pat. No. 4,576,850 (Martens), the disclosure of which is incorporated herein by reference.

Ethylenically unsaturated resins include both monomeric and polymeric compounds that contain atoms of carbon, hydrogen and oxygen, and optionally nitrogen, sulfur, and halogens. Oxygen or nitrogen atoms, or both, are generally present in ether, ester, urethane, amide, and urea groups. In some embodiments, ethylenically unsaturated compounds have a number average molecular weight of less than about 4,000 (in some embodiments, are esters made from the reaction of compounds containing aliphatic monohydroxy groups, aliphatic polyhydroxy groups, and unsaturated carboxylic acids (e.g., acrylic acid, methacrylic acid, itaconic acid, crotonic acid, iso-crotonic acid, and maleic acid)). Some illustrative examples of compounds having an acrylic or methacrylic group that are suitable for use in the invention are listed below:

(1) Monofunctional compounds: ethyl (meth)acrylate, n-butyl (meth)acrylate, isobutyl (meth)acrylate, 2-ethylhexyl (meth)acrylate, n-hexyl (meth)acrylate, n-octyl (meth)acrylate, isooctyl (meth)acrylate, bornyl (meth)acrylate, tetrahydrofurfuryl (meth)acrylate, 2-phenoxyethyl (meth)acrylate, and N,N-dimethylacrylamide;

(2) Difunctional compounds: 1,4-butanediol di(meth)acrylate, 1,6-hexanediol di(meth)acrylate, neopentylglycol di(meth)acrylate, ethylene glycol di(meth)acrylate, triethyleneglycol di(meth)acrylate, tetraethylene glycol di(meth)acrylate, and diethylene glycol di(meth)acrylate; and (3) Polyfunctional compounds: trimethylolpropane tri(meth)acrylate, glycerol tri(meth)acrylate, pentaerythritol tri(meth)acrylate, pentaerythritol tetra(meth)acrylate, and tris(2-acryloyloxyethyl) isocyanurate.

Some representatives of other ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide. In some embodiments, two or more (meth)acrylate or ethylenically unsaturated components may be present in the crosslinkable or crosslinked resin composition.

If the resin composition is to be cured by radiation, other than by electron beam, then a photoinitiator may be included in the resin composition. If the resin composition is to be cured thermally, then a thermal initiator may be included in the resin composition. In some embodiments, a combination of radiation and thermal curing may be used. In such embodiments, the composition may include both a photoinitiator and a thermal initiator.

Exemplary photoinitiators that can be blended in the resin include the following: benzil, methyl o-benzoate, benzoin, benzoin ethyl ether, benzoin isopropyl ether, benzoin isobutyl ether, etc., benzophenone/tertiary amine, acetophenones (e.g., 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyldiphenylphosphine oxide, 2-methyl-1-4(methylthio), phenyl-2-morpholino-1-propanone, bis(2,4,6-trimethylbenzoyl)-phenylphosphine oxide and bis(2,6-dimethoxybenzoyl)(2,4,4-trimethylpentyl)phosphine oxide). The compounds may be used individually or in combination. Cationically polymerizable materials include materials containing epoxy and vinyl ether functional groups. These systems are photoinitiated by onium salt initiators, such as triarylsulfonium, and diaryliodonium salts. Other exemplary crosslinkable or crosslinked resin compositions are described, for example, in U.S. Pat. No. 8,986,812 B2 (Hunt et al.), U.S. Pat. No. 8,282,863 B2 (Jones et al.), and PCT Pub. No. WO 2014/46837, published Mar. 27, 2014, the disclosures of which are incorporated herein by reference.

In some embodiments, the first material of a microstructured layer comprises at least one of a crosslinkable or crosslinked composition. In some embodiments, a microstructured layer consists essentially of the crosslinked material.

Crosslinkable materials can be partially crosslinked by techniques known in the art, including actinic radiation (e.g., e-beam or ultraviolet light). Techniques for partially crosslinking a crosslinkable material include exposing an (meth)acrylate moiety containing composition to actinic radiation in the presence of an oxygen containing atmosphere. The (meth)acrylate containing composition can be further crosslinked by exposure to actinic radiation in an atmosphere substantially free of oxygen. Techniques for partially crosslinking a crosslinkable composition further include using a crosslinkable composition that comprises components that react with more than one type of crosslinking reaction where the reactions can initiated independently (e.g., a mixture containing both epoxy components that can be crosslinked by cationic polymerization and (meth)acrylate components that can be crosslinked by free radical polymerization). The crosslinkable composition can be partially crosslinked at a short time after initiating the crosslinking reaction (e.g., a cationic polymerization of an epoxy). The partially crosslinked composition can be further cured by techniques known in the art such as exposure to actinic radiation (e.g., e-beam or ultraviolet light).

Materials used in crosslinkable compositions are available for example, from Sartomer Company, Exton Pa.; Cytec Industries, Woodland Park, N.J.; Soken Chemical, Tokyo, Japan; Daicel (USA), Inc., Fort Lee, N.J.; Allnex, Brussels, Belgium; BASF Corporation, Charlotte, N.C.; Dow Chemical Company, Midland, Mich.; Miwon Specialty Chemical Co. Ltd., Gyoenggi-do, Korea; Hampford Research Inc., Stratford, Conn.; and Sigma Aldrich, St Louis, Mo.

Exemplary thermoplastic materials include those materials that can be processed by thermoplastic processing techniques such as extrusion. Exemplary thermoplastic materials include polyethylene, polypropylene, polymethyl methacrylate, polycarbonate, and polyester.

In some embodiments, both major surfaces of a microstructured layer include a microstructured surface. In some embodiments, a microstructured layer has a thickness defined by the smallest distance from any valley to the second major surface of the first, microstructured layer, and wherein the thickness is not greater than 25 micrometers (in some embodiments, not greater than 20 micrometers, 15 micrometers, or even not greater than 10 micrometers.

In some embodiments, the height of a microstructural feature of microstructured layer is in the range from 1 micrometer to 200 micrometers (in some embodiments, in the range from 1 micrometer to 150 micrometers, 5 micrometers to 150 micrometers, or even 5 micrometers to 100 micrometers).

Microstructured layers can comprise, for example, a crosslinkable or crosslinked composition or thermoplastic material, although the second microstructured layer comprises a crosslinkable or crosslinked composition.

In some embodiments, the first material of a microstructured layer comprises at least one of a crosslinkable or crosslinked composition. In some embodiments, a microstructured layer consists essentially of the crosslinked material.

In some embodiments, the height of a microstructural feature of microstructured layer is in the range from 1 micrometer to 200 micrometers (in some embodiments, in the range from 1 micrometer to 150 micrometers, 5 micrometers to 150 micrometers, or even 5 micrometers to 100 micrometers).

In some embodiments, a portion of each of the microstructural features of the first, microstructured layer at least partially penetrates into the second, microstructured layer (in some embodiments, the first, microstructured layer at least partially penetrates into the second, microstructured layer to a depth less than the average height of the respective microstructural feature). In some embodiments, the penetration depth of the each penetrating microstructural feature is not greater than 50 (in some embodiments, not greater than 45, 40, 35, 30, 25, 20, 15, 10, or even not greater than 5) percent of the respective height of the microstructural feature. The foregoing can also apply to other microstructural layers with regard to microstructural features adjacent to the major surface of an adjacent layer.

Exemplary adhesive materials include an interpenetrating network of the reaction product of a polyacrylate component and a polymerizable monomer (see, e.g., U.S. Pat. Pub. No. US2014/0016208 A1 (Edmonds et al.), the disclosure of which is incorporated herein by reference.

Another exemplary adhesive comprises a reaction product of a mixture comprising (meth)acrylate and epoxy in the presence of each other. In some embodiments, the (meth) acrylate is present in a range from 5 to 95 (in some embodiments, in a range from, 10 to 90 or even 20 to 80) percent by weight and the epoxy is present in a range from 5 to 95 (in some embodiments, in a range from 5 to 95, 10 to 90, or even 20 to 80) percent by weight, based on the total weight of the mixture. Exemplary (meth)acrylates include monofunctional (meth)acrylate compounds (e.g., ethyl (meth)acrylate, n-butyl(meth)acrylate, isobutyl(meth)acrylate, 2-ethylhexyl(meth)acrylate, n-hexyl(meth)acrylate, n-octyl(meth)acrylate, isooctyl (meth)acrylate, isobornyl (meth)acrylate, tetrahydrofurfuryl (meth)acrylate, 2-phenoxyethyl (meth)acrylate, methoxy Polyethylene glycol mono(meth)acrylate and N,N-dimethylacrylamide), difunctional (meth)acrylate materials (e.g., 1,4-butanediol di(meth)acrylate, 1,6-hexanediol di(meth)acrylate, neopentylglycol di(meth)acrylate, ethylene glycol di(meth)acrylate, triethyleneglycol di(meth)acrylate, tetraethylene glycol di(meth)acrylate, diethylene glycol di(meth)acrylate and polyfunctional (meth)acrylate materials (e.g., trimethylolpropane tri(meth)acrylate, ethoxylate trimethylolpropane tri(meth)acrylate, glyceroltri(meth)acrylate, pentaerythritol tri(meth)acrylate, and pentaerythritol tetra(meth)acrylate). In some embodiments, two or more (meth)acrylate components may be used in the adhesive material. Exemplary epoxies include (3-4-epoxycyclohexane) methyl 3'-4'-epoxycyclohexyl-carboxylate, bis(3,4-epoxycyclohexylmethyl) adipate, 4-vinyl-1-cyclohexene 1,2-epoxide, polyethylene glycol diepoxide, vinylcyclohexene dioxide, neopentyl glycol diglycidyl ether and 1,4-cyclohexanedimethanol bis(3,4-epoxycyclohexanecarboxylate. In some embodiments, the (meth)acrylate and the epoxy are present on the same molecule (e.g., (3-4-epoxycyclohexyl) methyl acrylate, 3,4-epoxycyclohexylmethyl methacrylate, glycidyl (meth)acrylate, and 4-hydroxybutyl (meth)acrylate glycidylether). In some embodiments, the mixture further comprises polyol functionalities (e.g., polyethylene glycol, polyester diol derived from caprolactone monomer, polyester triol derived from caprolactone monomer). In some embodiments, the mixture is substantially free of monofunctional (meth)acrylates (i.e., contains less than 10 percent by weight of monofunctional (meth)acrylates, based on the total weight of the adhesive material). In some embodiments, the (meth) acrylate and the epoxy do not react with each other.

Exemplary adhesive materials also include pressure sensitive adhesives, optically clear adhesives and structural adhesives known in the art. Exemplary adhesive materials also include crosslinkable compositions.

In some embodiments, it may be desirable to incorporate diffusion (i.e., a coating or coatings or a layer or layers that diffuse(s) light, or elements within an existing layer that diffuse light) in order, for example, to reduce the visibility of optical defects. In some embodiments, a layer comprising adhesive material further comprises a filler material (e.g., glass beads, polymer beads, inorganic particles such as fumed silica). In some embodiments, an adhesive layer may be discontinuous or patterned (e.g., an array of regular or irregular dots).

Exemplary polymeric layers include those comprising polyester, polycarbonate, cyclic olefin copolymer or polymethyl methacrylate. Exemplary polymeric layers include multilayer optical films including reflective polarizing film (available, for example, under the trade designation "DUAL BRIGHTNESS ENHANCEMENT FILM" or "ADVANCED POLARIZING FILM" available from 3M Company, St Paul, Minn.) or reflecting films (available, for example, under the trade designation "ENHANCED SPECULAR REFLECTOR" available from 3M Company). Exemplary polymeric layers include light guides used in optical displays. In some embodiments, exemplary polymeric layers include diffuser layers.

Exemplary diffuser layers include bulk diffusers and surface diffusers known in the art.

Exemplary diffuser layers include an embedded microstructured layer or a layer comprising a filler material, and can be prepared by techniques known in the art. Embedded microstructured layers can be prepared, for example, by creating the microstructural features on the desired surface using a material with a refractive index (e.g., polymeric or cross linkable material) and then coating a different material with a different refractive index (e.g., polymeric or cross linkable material) over the microstructural features. A diffuse layer comprising a filler material can be prepared, for example, by combining a filler material with a refractive index with a polymeric or crosslinkable material with a different refractive index and applying or coating the diffuse mixture onto the desired surface.

Exemplary diffuser layers include layers with a microstructured surface on one or both major surfaces (available, for example, under the trade designation "ULTRA DIFFUSER FILM" available from 3M Company). Exemplary diffuser layers include color conditioning diffusers (available, for example, under the trade designation "3M QUANTUM DOT ENHANCEMENT FILM" available from 3M Company). In some embodiments, only a portion of the microstructured surface of the diffuser layer is attached to an adjacent layer.

In some embodiments, a diffuser layer may be comprised of multiple layer (e.g., a combination of two or more of a cross-linked layer(s), microstructured layer(s), polymeric layer(s), or layer(s) comprising filler material).

In another aspect, the present disclosure describes a method for making articles described herein, the method comprising:

providing a first layer comprising a partially crosslinked crosslinkable composition, and having first and second opposed major surfaces;

providing a second microstructured layer having first and second opposed major surfaces, the first major surface being a microstructured surface having microstructual features; and laminating the first major surface of the second microstructured layer such that the first major surface of the second layer is attached to the second major surface of the first layer. In some embodiments, the first layer is a microstructured layer, wherein the first major surface of the first layer is a microstructured surface having microstructual features.

In some embodiments, the method further comprises attaching a polymeric layer (e.g., a polyester layer or multilayer optical film (e.g., polarizing film or reflecting film)) to the second major surface of the second layer.

In some embodiments, the second, microstructured layer is provided by coating a resin upon a tooling surface, curing the resin, and removing the second, microstructured layer from the tooling surface, wherein the tooling surface is a mold for forming the microstructured first major surface of the microstructured second layer. The second microstructured layer can be formed, for example, by applying a crosslinkable material onto a tooling surface, pressing a flexible polymeric film that does not adhere to the cross-linked material to the coated tooling surface, crosslinking the crosslinkable material, removing the polymeric film and then removing the second microstructured layer.

In some embodiments, the method, further comprises attaching the polymeric layer to the second major surface of the second, microstructured layer prior to curing the resin. The second microstructured layer can be formed, for example, by applying crosslinkable material onto a tooling surface, pressing a flexible polymeric film that does adhere to the crosslinked material to the coated tooling surface, crosslinking the crosslinkable material, removing second microstructure layer with second major surface of second microstructured layer attached to the polymeric film.

In some embodiments, during the laminating, the microstructual features of the microstructured surface of the second layer penetrate into the second major surface of the first layer.

In some embodiments, it is desirable to control the penetration depth of the microstructual features of the second layer into the second major surface of the first layer. The penetration depth can be controlled, for example, by controlling the thickness of the first layer. The penetration depth can also be controlled by increasing the viscosity of the first layer after the first layer is applied to a surface. For example, the viscosity of the first layer could be increased after coating by dissolving the composition of the first layer in a solvent, applying the composition onto the surface, and then removing the solvent from the composition prior to attaching the microstructual features of the third layer. The viscosity of the first layer could also be modified by partially crosslinking the composition after applying it onto a surface prior to attaching the microstructured surface of the second layer.

In some embodiments, the first, microstructured layer is provided by coating a resin upon a tooling surface, and curing the resin. In some embodiments, applying the second layer to the first, microstructured layer occurs when the first layer is still in contact with the tooling surface. In some embodiments, the laminating is performed while the first, microstructured layer is still in contact with the tooling surface. In some embodiments, the method further comprises removing the resulting first and second layer composite from the tooling surface.

Crosslinkable compositions can be coated onto the desired surface (e.g., tooling surface or polymeric layer) using known coating techniques (e.g., die coating, gravure coating, screen printing, etc.).

In some embodiments, articles described herein have a thickness not greater than 80 micrometers (in some embodiments, not greater than 75 micrometers, 70 micrometers, 65 micrometers, 60 micrometers, 55 micrometers, 50 micrometers, 45 micrometers, or even not greater than 40 micrometers).

In some embodiments, articles described herein have an optical gain of greater than 2.0 (in some embodiments, greater than 2.1, 2.2, or even greater than 2.3) as measured by the "Measurement of Optical Gain" in the Examples.

The layers of the articles described herein are adhered sufficiently to allow the further processing of the article. For example, a temporary film (e.g., a premask film) may be laminated to an optical film to protect it in subsequent manufacturing processes. The optical film may be cut or converted to the desired shape, the protective film removed and the optical film may then be assembled into an optical display or sub-assembly. The layers of the articles described herein are adhered sufficiently to stay adhered through the converting step, the removal of the temporary film and assembly into the optical display.

Articles described herein are useful, for example, for in optical film applications. For example, an article including a regular prismatic microstructured pattern can act as a totally internal reflecting film for use as a brightness enhancement film when combined with a back reflector; an article including a corner-cube prismatic microstructured pattern can act as a retroreflecting film or element for use as reflecting film; and an article including a prismatic microstructured pattern can act as an optical turning film or element for use in an optical display.

A backlight system can comprise a light source (i.e., a source capable of being energized or otherwise capable of providing light (e.g., LEDs)), a lightguide or waveplate, a back reflector, and at least one article described herein. Diffusers—either surface diffusers or bulk diffusers—may optionally be included within the backlight to hide visibility of cosmetic defects imparted through manufacturing or handling, or to hide hot spots, headlamp effects, or other non-uniformities. The backlight system may be incorporated, for example, into a display (e.g., a liquid crystal display). The display may include, for example, a liquid crystal module (including at least one absorbing polarizer), and a reflective polarizer (which may already be included in an embodiment of an article described herein).

Exemplary Embodiments

1A. An article comprising:

a first, microstructured layer comprising a first material, and having first and second opposed major surfaces, the first major surface being a microstructured surface, and the microstructured surface having peaks and valleys, wherein the peaks are microstructural features each having a height defined by the distance between the peak of the respective microstructural feature and an adjacent valley; and a second layer comprising at least one of a crosslinkable or crosslinked composition, and having first and second opposed major surfaces, wherein at least a portion of the second major surface of the second layer is directly attached to at least a portion of the first major surface of the first, microstructured layer. In some embodiments, the first major surface of the second layer is a microstructured surface, and the microstructured surface has peaks and valleys, wherein the peaks are microstructural features each having a height defined by the distance between the peak of the respective microstructural feature and an adjacent valley.

2A. The article of Exemplary Embodiment 1A, wherein a portion of each of the microstructural features of the first, microstructured layer at least partially penetrates into the second material of the second layer (in some embodiments, the first, microstructured layer at least partially penetrates into the second microstructured layer to a depth less the average height of the respective microstructural feature).

3A. The article of Exemplary Embodiment 2A, wherein the penetration depth of the each penetrating microstructural feature is not greater than 50 (in some embodiments, not greater than 45, 40, 35, 30, 25, 20, 15, 10, or even not greater than 5) percent of the respective height of the microstructural feature.

4A. The article of any preceding A Exemplary Embodiment, wherein the first material of the first, microstructured layer comprises at least one of a crosslinkable or crosslinked composition.

5A. The article of Exemplary Embodiments 1A to 3A, wherein the first, microstructured layer comprises the crosslinkable composition.

6A. The article of Exemplary Embodiments 1A to 3A, wherein the first, microstructured layer comprises the crosslinked composition.

7A. The article of Exemplary Embodiments 1A to 3A, wherein the first layer consists essentially of the crosslinked material.

8A. The article of any of Exemplary Embodiments 1A to 7A, wherein the second layer comprises the crosslinkable composition.

9A. The article of any of Exemplary Embodiments 1A to 7A, wherein the second layer comprises the crosslinked composition.

10A. The article of any of Exemplary Embodiments 1A to 7A, wherein the second layer consists essentially of the crosslinked material.

11A. The article of any preceding A Exemplary Embodiment, wherein the first, microstructured layer has a thickness defined by the smallest distance from any valley to the second major surface of the first, microstructured layer, and wherein the thickness is not greater than 25 micrometers (in some embodiments, not greater than 20 micrometers, or even not greater than 15 micrometers.

12A. The article of any preceding A Exemplary Embodiment, wherein the microstructural features of the first, microstructured layer are in the form of at least one of the following shapes: regular prismatic, irregular prismatic patterns (e.g., an annular prismatic pattern, a cube-corner pattern or any other lenticular microstructure), non-periodic protuberances, pseudo-non-periodic protuberances, or non-periodic depressions, or pseudo-non-periodic depressions.

13A. The article of any preceding A Exemplary Embodiment, wherein the height of a microstructural feature of the first layer is in the range from 1 micrometer to 200 micrometers (in some embodiments, in the range from 1 micrometer to 150 micrometers, 5 micrometers to 150 micrometers, or even 5 micrometers to 100 micrometers).

14A. The article of any preceding A Exemplary Embodiment, wherein the second major surfaces of the first, microstructured layer includes a microstructured surface.

15A. The article of any preceding A Exemplary Embodiment, wherein wherein the second layer is a microstructured layer and has a thickness defined by the smallest distance from any valley to the second major surface of the first, microstructured layer, wherein the thickness is not greater than 25 micrometers (in some embodiments, not greater than 20 micrometers, or even not greater than 15 micrometers).

16A. The article of any preceding A Exemplary Embodiment, wherein the second layer comprises at least one of a crosslinkable or crosslinked composition comprising an (meth)acrylate or an epoxy.

17A. The article of any preceding A Exemplary Embodiment, wherein the microstructural features of the second layer are in the form of at least one of the following shapes: regular prismatic, irregular prismatic patterns (e.g., an annular prismatic pattern, a cube-corner pattern or any other lenticular microstructure), non-periodic protuberances, pseudo-non-periodic protuberances, or non-periodic depressions, or pseudo-non-periodic depressions.

18A. The article of any preceding A Exemplary Embodiment, wherein the height of a microstructural feature of the second layer is in the range from 1 micrometer to 200 micrometers (in some embodiments, in the range from 1 micrometer to 150 micrometers, 5 micrometers to 150 micrometers, or even 5 micrometers to 100 micrometers).

19A. The article of any preceding A Exemplary Embodiment, wherein the second major surface of the second microstructured layer includes a microstructured surface.

20A. The article of any preceding A Exemplary Embodiment, further comprising a diffuser layer having first and second major surfaces, wherein the first major surface is attached to the second major surface of the first microstructured layer.

21A. The article of Exemplary Embodiment 20A, further comprising a first adhesive layer disposed between the first microstructured layer and the diffuser layer.

22A. The article of any preceding A Exemplary Embodiment, further comprising a first polymeric layer (e.g., a polyester layer or multilayer optical film (e.g., polarizing film or reflecting film)) having first and second major surfaces, wherein the first major surface is attached to the second major surface of the first, microstructured layer.

23A. The article of Exemplary Embodiment 22A, further comprising a diffuser layer disposed between the first layer and the first polymeric layer.

24A. The article of any preceding A Exemplary Embodiment, further comprising an second adhesive layer having first and second opposed major surfaces, wherein the second major surface of the second adhesive layer is attached to the first major surface of the second microstructured layer.

25A. The article of Exemplary Embodiment 24A, further comprising a second polymeric layer (e.g., a polyester layer or multilayer optical film (e.g., polarizing film or reflecting film)) having first and second major surfaces, wherein the second major surface is attached to the first major surface of the second adhesive layer.

26A. The article of Exemplary Embodiment 25A, further comprising a third adhesive layer having first and second opposed major surfaces, wherein the second major surface of the third adhesive layer is attached to the first major surface of the second polymeric layer.

27A. The article of any preceding A Exemplary Embodiment, further comprising a diffuser layer having first and second major surfaces, wherein the first major surface is attached to the second major surface of the first polymeric layer.

28A. The article of Exemplary Embodiment 27A, further comprising a fourth adhesive layer disposed between the first polymeric layer and the second diffuser layer.

29A. The article of any preceding A Exemplary Embodiment, wherein the article has a thickness not greater than 80 micrometers (in some embodiments, not greater than 75 micrometers, 70 micrometers, 65 micrometers, 60 micrometers, 55 micrometers, 50 micrometers, 45 micrometers, or even not greater than 40 micrometers).

30A. The article of any preceding A Exemplary Embodiment having an optical gain greater than 2.0 (in some embodiments, greater than 2.1, 2.2, or even greater than 2.3).

31A. A backlight system comprising a light source, a back reflector, and at least one article of any preceding A Exemplary Embodiment.

1B. A method of making the article of any of Exemplary Embodiments 1A to 30A, the method comprising:

providing a first layer comprising a partially crosslinked crosslinkable composition, and having first and second opposed major surfaces;

providing a second microstructured layer having first and second opposed major surfaces, the first major surface being a microstructured surface having microstructual features; and laminating the first major surface of the second microstructured layer such that the first major surface of the second layer is attached to the second major surface of the first layer. In some embodiments, the first layer is a microstructured layer, wherein, the first major surface of the first layer is a microstructured surface having microstructual features.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Test Methods
Measurement of Optical Gain:

Optical gain was measured by placing the film or film laminate on top of a diffusively transmissive hollow light box. The diffuse transmission and reflection of the light box were approximately Lambertian. The light box was a six-sided hollow rectangular solid of dimensions 12.5 cm by 12.5 cm by 11.5 cm made from diffuse polytetrafluoroethylene (PTFE) plates about 0.6 mm thick. One face of the box was designated as the sample surface. The hollow light box had a diffuse reflectance of about 0.83% measured at the sample surface averaged over the 400-700 nm wavelength range.

During the gain test, the box was illuminated from within through a circular hole about 1 cm in diameter in the surface of the box opposite the sample surface, with the light directed toward the sample surface. The illumination was provided by a stabilized broadband incandescent light source attached to a fiber optic bundle used to direct the light (obtained under the trade designation "FOSTEC DCR-III" from Schott North America, Southbridge Mass.) with a one cm diameter fiber bundle extension (obtained under the trade designation "SCHOTT FIBER OPTIC BUNDLE" from Schott North America). A linear absorbing polarizer (obtained under the trade designation "MELLES GRIOT 03 FPG 007" from CVI Melles Griot, Albuquerque, N. Mex.) was mounted on a rotary stage (obtained under the trade designation "ART310-UA-G54-BMS-9DU-HC" from Aerotech, Pittsburgh, Pa.) and placed between the sample and the camera. The camera was focused on the sample surface of the light box at a distance of about 0.28 meters and the absorbing polarizer was placed about 1.3 cm from the camera lens.

The luminance of the illuminated light box, measured with the polarizer in place and no sample films in place was greater than 150 candela per square meters ($cd/m^2$). The sample luminance was measured with a spectrometer (obtained under the trade designation "EPP2000" from StellarNet Inc., Tampa, Fla.) connected to a collimating lens via a fiber optic cable (obtained under the trade designation "F1000-VIS-NIR" from StellarNet Inc.); the spectrometer was oriented at normal incidence to the plane of the box sample surface when the sample films were placed on the sample surface. The collimating lens was composed of a lens tube (obtained under the trade designation "SM1L30" from Thorlabs, Newton, N.J.) and a plano-convex lens (obtained under the trade designation "LA1131" from Thorlabs); the setup was assembled to achieve a focused spot size of 5 mm at the detector. Optical gain was determined as the ratio of the luminance with the sample film in place to the luminance from the light box with no sample present. For all films, optical gain was determined at polarizer angles of 0, 45, and 90 degrees relative the sample orientation. For samples that do not contain a reflective polarizing film, the average optical gain of the values measured at 0 and 90 degrees was reported. For samples that do contain a reflective polarizing film, the maximum optical gain was reported.

Measurement of Thickness

Thickness was measured with a digital indicator (obtained under the trade designation "ID-F125E" from Mitutoyo America, Aurora, Ill.) mounted on a granite base stand (obtained under the trade designation "CDI812-1" form Chicago Dial Indicators Co., Inc., Des Plaines, Ill.). The digital indicator was zeroed while in contact with the granite base. Five measurements of the sample thickness were measured at the corners and center of a 3 cm by 3 cm square. The average of the five thickness measurements was reported.

Scanning Electron Micrograph Images

Scanning electron micrograph images were obtained by metallizing the sample in a vacuum chamber (obtained under the trade designation "DENTON VACUUM DESK II" from Denton Vacuum LLC, Moorestown, N.J.) and imaging in a scanning electron microscope (obtained under the trade designation "PHENOM PURE" Model PW-100-010 from Phenom-World BV, The Netherlands).

Preparation of Tooling Surface

A tooling surface was prepared by treating the microreplicated surface of a brightness enhancement film (obtained under the trade designation "VIKUTI THIN BRIGHTNESS ENHANCEMENT FILM (TBEF) II 90/24" film from 3M Company) in a tetramethylsilane and oxygen plasma as described in Example 4 of U.S. Pat. No. 9,102,083 B2 (David et al.), the disclosure of which is incorporated herein by reference. The brightness enhancement was primed with argon gas at a flow rate of 250 standard cubic centimeters per minute (SCCM), a pressure of 25 milliTorr (mTorr) and RF power of 1000 Watts (W) for 30 seconds. Subsequently, the film was exposed to tetramethylsilane (TMS) plasma at a TMS flow rate of 150 SCCM. The pressure in the chamber was 25 mTorr and the RF power was 1000 W for 10 seconds.
Preparation of Crosslinkable Resin Composition A A crosslinkable resin composition was prepared by mixing 75 parts by weight epoxy acrylate (obtained under the trade designation "CN 120" from Sartomer Company) 25 parts by weight of 1,6 hexanediol diacrylate (obtained under the trade designation "SR 238" from Sartomer Company) 0.25 part by weight initiator (obtained under the trade designation "DAROCUR 1173" from BASF Corporation) and 0.1 part by weight initiator (obtained under the trade designation "IRGACURE TPO" from BASF Corporation).

Example 1

A crosslinkable resin composition was prepared according to Example 2 of U.S. Pat. No. 8,282,863 B2 (Jones, et. al.) the disclosure of which is incorporated herein by reference. A bead of the crosslinkable composition was placed on the tooling surface. Conventional 0.050 mm (50 micrometer) thick biaxially-oriented polyester film was laminated over the crosslinkable resin with a hand roller. The construction was then exposed to UV light from a UV curing system (obtained under the trade designation "FUSION UV CURING SYSTEM" from Fusion UV Systems, Inc., Gaithersburg, Md.) with a D bulb operating at 3600 watts at a speed of 15.2 meters per minute (m/min). The tooling surface was removed leaving the first microstructured layer on the polyester film surface. A bead of the crosslinkable composition was placed on tooling surface and spread with a wire wound rod (obtained under the trade designation "#5 WIRE WOUND ROD" from R.D. Specialties). A second microstructured layer was prepared by exposing the crosslinkable composition on the tooling surface to UV light from a UV curing system ("FUSION UV CURING SYSTEM") with a D bulb operating at 3600 watts at a speed of 15.2 m/min. The first and second microstructured layers were attached at one edge with adhesive tape (obtained under the trade designation "SCOTCH MAGIC TAPE, CAT. 810" from 3M Company, St. Paul, Minn.), but the surfaces of the two microstructured layers were not allowed to touch. The prisms of the first and second microstructured layer were oriented approximately orthogonal to each other. The first and second microstructured layers were place in a reclosable bag (obtained under the trade designation "RELOC ZIPPIT" from United States Plastic Corporation, Lima, Ohio) The bag was purged with nitrogen for 3 minutes. The microstructured surface of the first microstructure layer was laminated to the non-microstructured surface of the second layer while still in the reclosable bag. The construction was then exposed to the light from a UV curing system ("FUSION UV CURING SYSTEM") with a D bulb operating at 6000 watts at a speed of 15.2 m/min. The resulting Example 1 article was prepared by removing the polyester film from the first microstructure layer and the tooling surface from the second microstructured layer.

The thickness of the Example 1 article was measured at 0.065 mm and the average optical gain was measured at 2.05.

Cross-sections of the Example 1 article were cut with a razor blade approximately parallel and perpendicular to the prisms of the first microstructured layer. FIG. 2A is a SEM photomicrograph of the Example 1 article at 1900X cut perpendicular to the prisms of the first microstructured layer. FIG. 2B is a SEM photomicrograph of the Example 1 article at 1900X cut perpendicular to the prisms of the second microstructured layer.

Example 2

A crosslinkable resin composition was prepared by mixing the components in Table 1 (below) at the indicated weight ratios.

TABLE 1

| Component (Obtained under trade designation) | Supplier | Description | Parts by Weight |
|---|---|---|---|
| "CN 120" | Sartomer Company, Exton, PA | (Meth)acrylate | 30 |
| "CELLOXIDE 2021P" | Diacel, Fort Lee, NJ | Epoxy | 40 |
| "SR 238" | Sartomer Company, Exton, PA | (Meth)acrylate | 10 |
| "CAPA 2054" | Perstorp, Malmo, Sweden | Polyol | 20 |
| TRIARYLSULFONIUM HEXAFLUOROANTIMONATE" | Sigma-Aldrich, St. Louis, MO | Initiator | 2 |
| "IRGACURE TPO" | BASF Corporation, Charlotte, NC | Initiator | 0.54 |
| "DAROCUR 1173" | BASF Corporation | Initiator | 0.6 |

A bead of the crosslinkable composition was placed on the tooling surface. Conventional 0.050 mm (50 micrometer) thick biaxially-oriented polyester film was laminated over the crosslinkable resin with a hand roller. The construction was then exposed to UV light from a source (obtained under the trade designation "FIREPOWER FP501" from Phoseon Technology Inc. Hillboro, Oreg.) operating at 100% power by passing the construction under the UV source in a nitrogen purged atmosphere at a distance of 1.9 cm and a speed of 7.6 m/min. The polyester film was removed leaving the second microstructured layer on the tooling surface. The microstructured surface of a brightness enhancement film (obtained under the trade designation "THIN BRIGHTNESS ENHANCEMENT FILM TBEF3 (24) N" from 3M Company) was laminated to the second microstructured layer. The sample was then exposure to the light from a UV curing system ("FUSION UV CURING SYSTEM") with a D bulb operating at 3600 watts at a speed of 15.2 m/min. The resulting Example 2 article was prepared by removing the tooling surface.

The thickness of the Example 2 article was measured at 0.071 mm and the average optical gain was measured at 1.75.

Figure 3A:
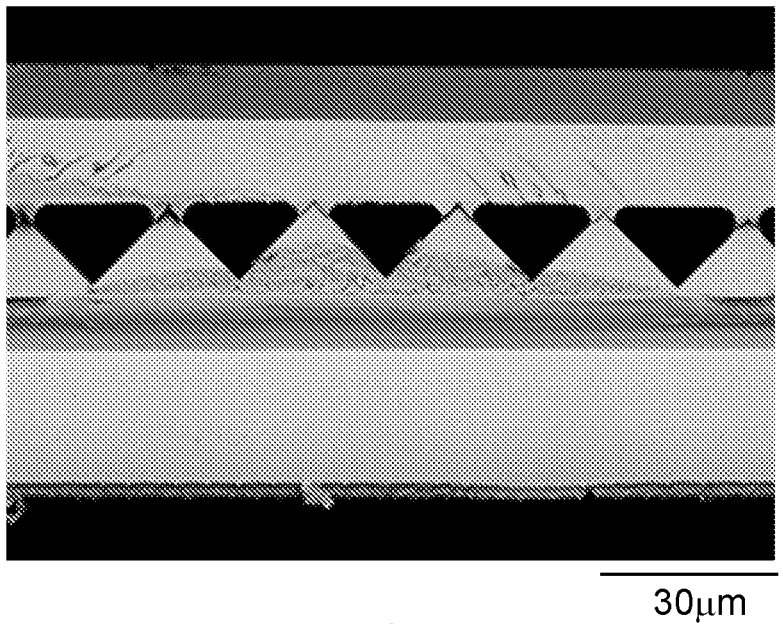
FIG. 3A is an SEM photomicrograph of the Example 2 article at 1900X cut perpendicular to the prisms of the first microstructured layer.
Figure 3B:
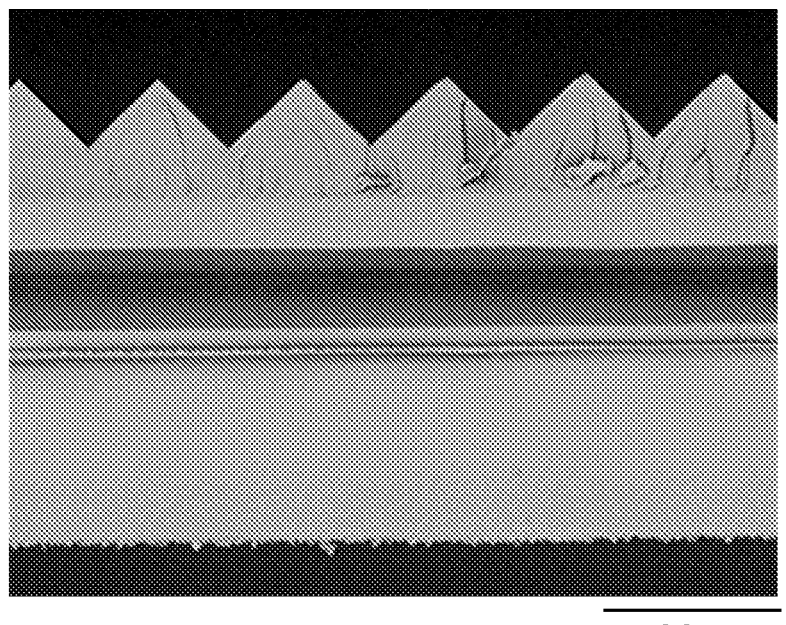
FIG. 3B is an SEM photomicrograph of the Example 2 article at 1900X cut perpendicular to the prisms of the second microstructured layer.

Cross-sections of the Example 2 article were cut with a razor blade approximately parallel and perpendicular to the prisms of the first microstructured layer. FIG. 3A is a SEM photomicrograph of the Example 2 article at 1900X cut perpendicular to the prisms of the first microstructured layer. FIG. 3B is a SEM photomicrograph of the Example 2 article at 1900X cut perpendicular to the prisms of the second microstructured layer.

Example 3

A bead of the crosslinkable resin Composition A was placed on the tooling surface and spread with a wire wound rod (obtained under the trade designation "#6 WIRE WOUND ROD" from R.D. Specialties). The construction was then exposed to UV light from a UV curing system ("FUSION UV CURING SYSTEM") with a D bulb operating at 3600 watts at a speed of 15.2 m/min. The partially cured composition and a piece of brightness enhancement film ("THIN BRIGHTNESS ENHANCEMENT FILM TBEF3 (24) N") were attached at one edge with adhesive tape ("SCOTCH MAGIC TAPE, CAT. 810"), but the surfaces of the two microstructured layers were not allowed to touch. The prisms of the two microstructured layer were oriented approximately orthogonal to each other. The construction was placed in a recloseable bag ("RELOC ZIP-PIT") and the bag was purged with nitrogen from 3 minutes. The microstructured surface of the brightness enhancement film was laminated to the non-microstructured surface of the second microstructured layer while still in the reclosable bag. The construction was then exposed to the light from a UV curing system ("FUSION UV CURING SYSTEM") with a D bulb operating at 6000 watts at a speed of 15.2 m/min. The resulting Example 3 article was prepared by removing tooling surface.

The thickness of the Example 3 article was measured at 0.086 mm and the average optical gain was measured at 1.74.

Figure 4A:
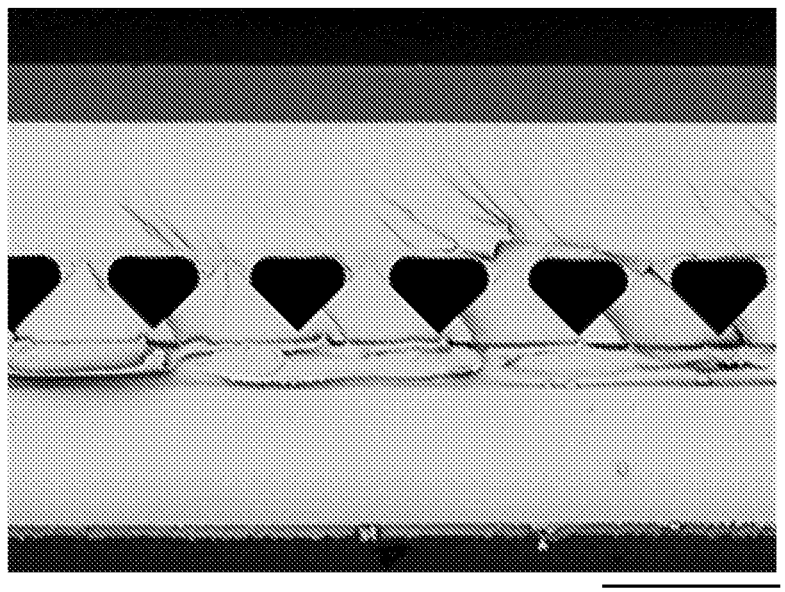
FIG. 4A is an SEM photomicrograph of the Example 3 article at 1900X cut perpendicular to the prisms of the first microstructured layer.
Figure 4B:
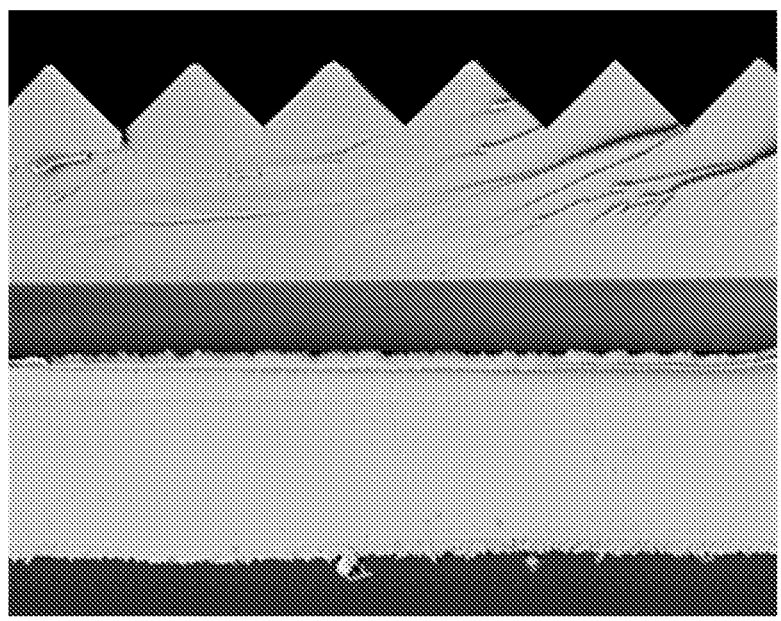
FIG. 4B is an SEM photomicrograph of the Example 3 article at 1900X cut perpendicular to the prisms of the second microstructured layer.

Cross-sections of the Example 3 article were cut with a razor blade approximately parallel and perpendicular to the prisms of the first microstructured layer. FIG. 4A is a SEM photomicrograph of the Example 3 article at 1900X cut perpendicular to the prisms of the first microstructured layer. FIG. 4B is a SEM photomicrograph of the Example 3 article at 1900X cut perpendicular to the prisms of the second microstructured layer.

Example 4

A first microstructured layer was prepared as generally described in U.S. Pat. No. 5,175,030 (Lu et al.) and U.S. Pat. No. 5,183,597 (Lu), the disclosures of which are incorporated herein by reference. More specifically the first microstructured layer was a prism film described in U.S. Pat. Pub. No. 2013/0004728 (Boyd et al.), the disclosure of which is incorporated herein by reference. The first microstructured layer included the bonding portions described in U.S. Pat. Pub. No. 2013/0004728 (Boyd et al.) on each prism. The prisms had a 90 degree angle and were spaced every 0.024 mm (24 micrometer). A 0.029 mm (29 micrometer) thick conventional biaxially-oriented polyester film with an adhesion promoter ("RHOPLEX 3208") and crosslinkable resin Composition A were used.

A crosslinkable composition was prepared by mixing 80 parts by weight of epoxy ("CELLOXIDE 2021P") 20 parts by weight of polyol (obtained under the trade designation "CAPA 3091" from Perstorp) and 1 part by weight initiator (obtained under the trade designation "OPPI SbF6" from Hamford Research Products, Stratford, Conn.). The crosslinkable composition was coated onto the tooling surface by placing a bead of the crosslinkable composition along one edge of the tooling surface and laminating a piece of 0.125 mm (125 micrometer) thick conventional biaxially-oriented polyester film with a hand roller. The polyester film was then removed and the crosslinkable composition remaining on the tooling surface was allowed to level for 1 minute. The crosslinkable composition was then exposed to UV light from a UV curing system ("FUSION UV CURING SYSTEM") with a D bulb operating at 2400 watts at a speed of 15.2 m/min.

The microstructured surface of the first microstructured layer was laminated to the crosslinkable composition 30 seconds after the crosslinkable composition was exposed to UV light. The prisms of the first microstructured layer and the prisms of the crosslinkable composition were orientated approximately orthogonal to each other. The construction was placed into an 80° C. oven for 5 minutes. The resulting Example 4 article was prepared by removing the tooling surface.

The thickness of the Example 4 article was measured at 0.096 mm and the average optical gain was measured at 1.95.

Cross-sections of the Example 4 article were cut with a razor blade approximately parallel and perpendicular to the prisms of the first microstructured layer. FIG. 5A is a SEM photomicrograph of the Example 4 article at 1300X cut perpendicular to the prisms of the first microstructured layer. FIG. 5B is a SEM photomicrograph of the Example 4 article at 1500X cut perpendicular to the prisms of the second microstructured layer.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An article comprising:
   a first, microstructured layer comprising a first material, and having first and second opposed major surfaces, the first major surface being a microstructured surface, and the microstructured surface having peaks and valleys, wherein the peaks are microstructural features each having a height defined by the distance between the peak of the respective microstructural feature and an adjacent valley; and
   a second microstructured layer comprising a second material comprising at least one of a crosslinkable or crosslinked composition, the second material being at least partially uncured, and having first and second opposed major surfaces, the first major surface being a microstructured surface, and the microstructured surface having peaks and valleys, wherein the peaks are microstructural features each having a height defined by the distance between the peak of the respective microstructural feature and an adjacent valley, wherein at least a portion of the second major surface of the second microstructured layer is directly and permanently attached to at least a portion of the first major surface of the first, microstructured layer, and wherein a portion of each of the microstructural features of the first, microstructured layer at least partially penetrates into the at least partially uncured second material of the second layer.

2. The article of claim 1, wherein the first material of the first, microstructured layer comprises at least one of a crosslinkable or crosslinked composition.

3. The article of claim 1, wherein the first, microstructured layer comprises the crosslinkable composition.

4. The article of claim 1, wherein the first, microstructured layer comprises the crosslinked composition.

5. The article of claim 1, wherein the second layer comprises the crosslinkable composition.

6. The article of claim 1, wherein the second layer comprises the crosslinked composition.

7. The article of claim 1, wherein the first, microstructured layer has a thickness defined by the smallest distance from any valley to the second major surface of the first, microstructured layer, and wherein the thickness is not greater than 25 micrometers.

8. The article of claim 1, wherein the second microstructured layer has a thickness defined by the smallest distance from any valley to the second major surface of the first, microstructured layer, wherein the thickness is not greater than 25 micrometers.

9. The article of claim 1, wherein the article has a thickness not greater than 80 micrometers.

\* \* \* \* \*